United States Patent [19]

Lapeyre

[11] Patent Number: 4,567,567
[45] Date of Patent: Jan. 28, 1986

[54] COMPUTER KEYBOARD DISPLAYING MANY OPERATING INSTRUCTIONS WITH FEW KEYS

[75] Inventor: James M. Lapeyre, New Orleans, La.

[73] Assignee: The Laitram Corporation, New Orleans, La.

[21] Appl. No.: 459,997

[22] Filed: Jan. 21, 1983

[51] Int. Cl.³ ............................................. G06F 3/027
[52] U.S. Cl. .................................................... 364/709
[58] Field of Search ........................ 364/709, 200, 900

[56] References Cited

U.S. PATENT DOCUMENTS

| | | | |
|---|---|---|---|
| 3,597,600 | 5/1969 | Herendeen | 364/709 |
| 3,762,637 | 10/1973 | Hernandez | 364/709 |
| 3,892,958 | 7/1975 | Tung | 364/709 |
| 4,178,633 | 12/1979 | Olander, Jr. et al. | 364/709 |
| 4,247,905 | 1/1981 | Yoshida et al. | 364/709 |
| 4,302,816 | 11/1981 | Yamamoto | 364/709 |

*Primary Examiner*—David H. Malzahn
*Attorney, Agent, or Firm*—Laurence R. Brown

[57] ABSTRACT

The number of keys on a keyboard are reduced by employing the decimal point key as a control key when stroked the second time in the entry of a decimal number word. This eliminates the need for a key standard in the computer arts which is either designated as an "enter" key or as an "=" key depending upon the computer arithmetic process. It thereby becomes possible to use only twelve keys on a keyboard to control a modern computer with the order of 133 built-in programs or execution commands. This is done by providing in addition to ten decimal keys 0 to 9 and the decimal point key one additional control or execute key which initiates a two or more sequential key program step select mode in which any of the twelve keys are then stroked to designate a particular execution command. An accompanying graphic display of the various execution choices available makes the keyboard usable without necessity of frequent consultation of an instruction manual.

7 Claims, 3 Drawing Figures

COMPUTER KEYBOARD DISPLAYING MANY OPERATING INSTRUCTIONS WITH FEW KEYS

TECHNICAL FIELD

This invention relates to computer keyboards and more particularly it relates to a system which significantly increases the utility of the decimal point key and the identification of large numbers of operating instructions with a few manually actuated keys.

BACKGROUND ART

A variety of hand held computers are available in the art as shown for example in catalogs from firms such as Personal Computer Products, Inc., P.O. Box 190198, Dallas, Tex. 75219-0198. These computers operate from computer chips which provide more than 100 separate built-in programs for performing arithmetic and data processing functions. The chips are rapidly becoming more diverse and the capacity of keyboards to handle more functions in hand held computers is limited.

Keyboard U.S. Pat. No. 3,892,958—July 1, 1975 to C. C. Tung is exemplary of the trend in keyboards. The objective is to reduce the number of computer keyboard keys and 35 keys are used. Prefix keys (gold - f and blue - g) are used for establishing an execution selection mode to permit the keyboard to select different function modes thereby permitting some keys to serve different purposes. This extends the range of a 39 key keyboard available in a Hewlett Packard Model 15C computer to make accessible more of the built-in operating function and program modes, namely 96, which is undoubtedly far less than the number available on computer chips in the present state of the art. Thus, access to the full capacities of the chips is not feasible with the prior art keyboards, and a relatively large number of keys is still required.

Furthermore, with the 39 keys, as illustrative of the trend to more powerful chips, in a hand held computer the keys have to be placed so close together that it is difficult to make choices manually without fingering a wrong key. Also a sequence of reasoned selections must be made on prior art keyboards that introduces many opportunities for potential error into the key selection process. For example, in the referenced patent, a key must be found with a desired function, the color noted and then a prefix color key actuated on a different part of the keyboard before returning to the selected function. With keys spaced by the order of one centimeter apart and a human finger of the breadth of about two centimeters, there is little room, which breeds errors.

Also, if the technique is adopted for larger keyboards it is very difficult to learn a "touch" selection system because of the large number of keys and awkward finger positions. It would certainly be desirable therefore to confine the keyboard reach to fall more into line with that of the number entry keys conventional in simple calculators used by accountants and the like.

It is therefore a general object of this invention to improve the state of the art in computer keyboards by correction of the foregoing prior art deficiencies. Other objects, features and advantages of the invention will be found throughout the following description and claims and in the accompanying drawing.

DISCLOSURE OF THE INVENTION

This invention makes possible the complete control of data entry and computer instruction in a powerful modern computer to select as many as 133 different built-in execution functions from as few as twelve keys which include ten decimal digit keys 0 to 9 and a decimal point key. Thus only one execute control key sets up an execution selection mode so that two sequentially following keystrokes of the twelve keys can provide the 133 selections. With three sequential keystrokes 1,453 selections can be provided.

Reduction of the total number of keys and direct elimination of one key is made possible by dual use of the decimal point key. This is feasible because no numerical word has more than one decimal point. Thus, the second occurrence of a decimal point keystroke in a word changes the data entry mode, in which the digits of the word are sequentially entered by stroking the digit keys, to establish a computer mode for manipulating that word. Thus, for example, if the computer uses the (RPN) Reverse Polish Notation mode of calculation instead of the arithmetic conventional mode, the second decimal point keystroke will serve to enter the word as an operand into an appropriate computer register to replace the "enter" key. In the conventional arithmetic mode the second decimal point keystroke will replace the "=" key to initiate the preselected calculation such as add, subtract, divide or multiply.

The reduction of the total number of keys follows from the use of an execution (XQ) control key to change the computer operation from a data entry mode to a function select mode which activates the keyboard for designating the data manipulation command to be executed by the computer. When the designation of the command is controlled by two sequential keystrokes, the selection of computer command steps is increased to 133 with the twelve keys, as contrasted with the hereinbeforementioned prior art use of 39 keys for 96 command steps. In very simple calculators or in certain modes, the present invention permits the command to be controlled by 2 sequential keystrokes in which case the functions selectable are at least 133 for twelve keys. Alternatively in more sophisticated computers the number of functions selectable increases to 1,453 if three sequential keystrokes are acceptable.

THE PREFERRED EMBODIMENTS

Figure 1:
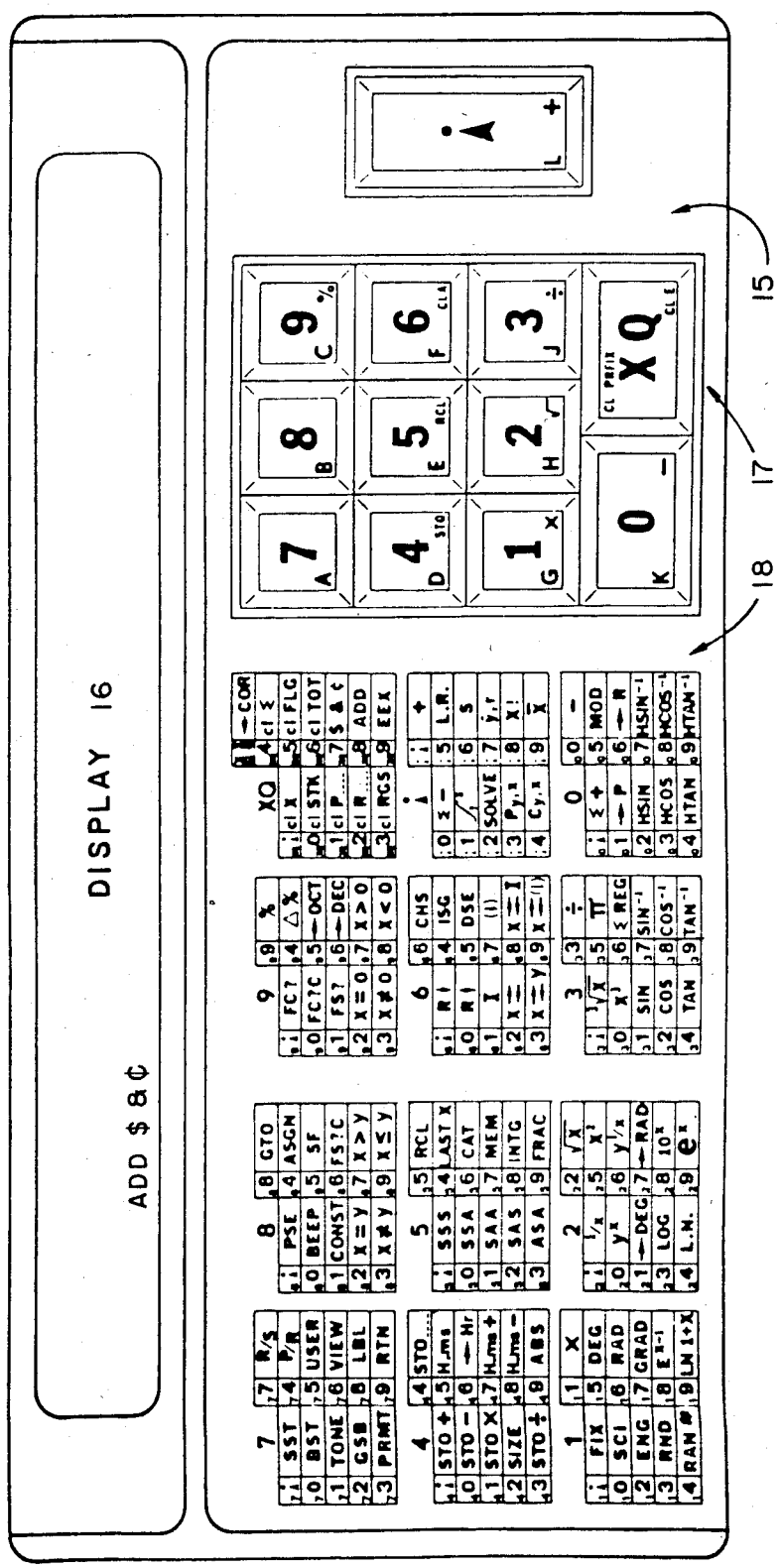
FIG. 1 is a plan view of a preferred keyboard configuration afforded by this invention permitting twelve keys to enter data and select 133 computer command steps.

The exemplary computer keyboard 15 in FIG. 1 has a temporary electronic display panel 16, a set of twelve keys 17 and a graphic chart 18 accompanying the keyboard and charting by appropriate abbreviations 133 computer execution steps available in the execution selection mode of the computer with this set of twelve keys. First consider only the primary notation on the keys identified by the large bold symbols. These twelve keys include the decimal digit entry keys 0 to 9 for sequentially introducing decimal digits to form a multi-digit word and a decimal point key for inserting in the proper place in the sequence of digits the decimal point. The additional key with the notation XQ is a control key for initiating the execution of the various functions of the computer charted on the chart 18.

The arrow notation on the decimal point key signifies that the key also serves as a data (word) entry key. Thus a numeric word only has one decimal point. Accordingly, the second decimal point keystroke in a single word serves to enter the word as an operand into an appropriate computer register. If that be followed by another word and an XQ keystroke terminating that word, then the data manipulation step to be performed on that word may be selected by two sequential further keystrokes of selected ones of the keys. This embodiment follows the (RPN) reverse polish notation mode of operation.

The notation at the lower right hand corner of the keys may now be considered. For example, the zero key has a − symbol and the decimal point key a + symbol. These signify subtraction and addition respectively. Thus to effect one of these computer functions upon the two previous words entered the keys are stroked twice, namely 00 for subtraction and .. for addition. By similar action any one of the charted functions can be selected for execution.

It will be noted that if the computer is put into the ADD mode by executing XQ8 then the stroking of the decimal point a second time directly adds the keyed in number to the previous total shown in the display. In the ADD mode then, the functions shown in the lower right hand corner of the keys may be accessed by a single stroke of the appropriate key following the stroking of the XQ key.

Example: Go to the ADD MODE:

| (XQ) (XQ) (8) | ADD appears in the display. |
|---|---|

Then to add numbers 15.75+16.98+20.32 the keystrokes are as follows assuming the display has been cleared

| (XQ) (XQ) (6) (○) | DISPLAY : 0.00<br>On the second stroke in this mode the decimal key becomes a + key, in the ADD MODE only. |
|---|---|
| (1) (5) (.) (7) (5) (+) | DISPLAY : 15.75 |
| (1) (6) (.) (9) (8) (+) | DISPLAY : 32.73 |
| (2) (0) (.) (3) (2) (+) | DISPLAY : 53.05 |

Now if 3.58 is to be subtracted from the displayed total simply stroke:

| (3) (.) (5) (8) (XQ) (0−) | DISPLAY : 49.47 |
|---|---|

If while in the ADD mode 15% of the displayed number is required simply stroke:

| (1) (5) (XQ) (9) | DISPLAY : 7.4205 |
|---|---|

In addition to the example shown we have another mode for use primarily by the touch system 12-key keyboard and that mode is the $/¢ mode (XQ) (XQ) (7) . In the $¢ mode the computer "knows" where the decimal point has to be and therefore the first stroking of the decimal point key automatically adds the number and points off the pennies. For example, in the ADD mode and in the $/¢ mode, to add a column of figures the operator need only enter the pennies i.e. 2539 ($25.39) and on the first stroke of the decimal point key the number is added, this saves all stroking of the decimal key, as a decimal point, which has now become a plus key.

Review of the chart 18 shows that for each key, such as 1, there is a listing of eleven functions which can be selected by initial selection of the primary key and thereafter a secondary key. (If the execute key is not to be used as a clear key for a partially entered function selection, then this listing of eleven could in fact be twelve.) Thus, 1-1 selects the multiply (X) function, whereas 1-6 selects RAD mode, 1-5 selects DEG mode, etc. The XQ key thus serves as a clear entry (CLE) key. In general the more frequently used functions are selectable by the double stroke of the same key after the XQ key initiates the function select mode.

It is to be noted that computer chips now available in the art have built-in accessible program steps corresponding to those set forth in chart 18 plus many more. As set forth hereinafter, the techniques of this invention are simple and within the standard scope of operation procedures now commonly used in the art.

Figure 2:
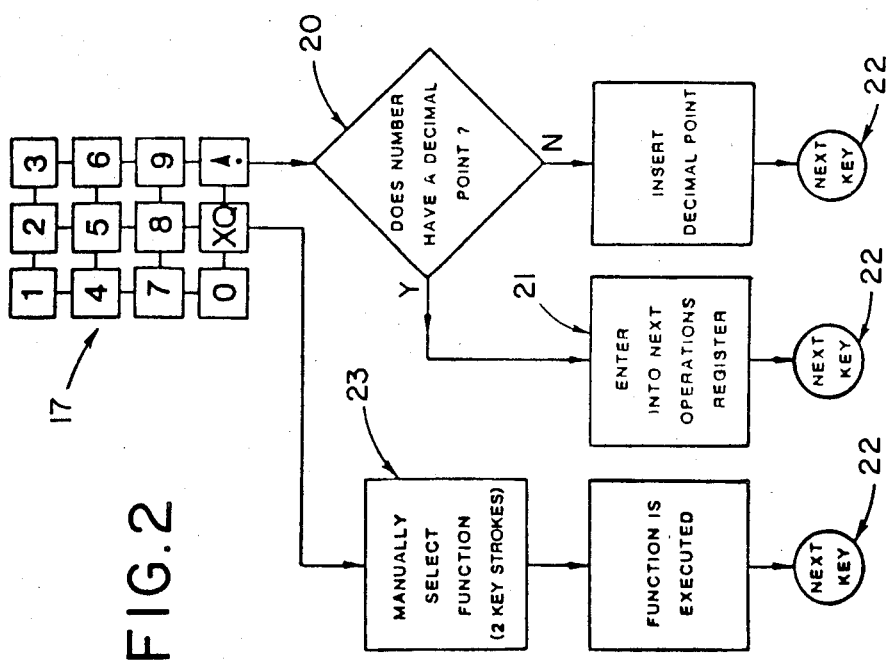
FIG. 2 is a schematic data flow chart of the operational control system of the invention using two control keys, namely the execute key (XQ) and the decimal point key to control the computer operation modes.

The flow diagram of FIG. 2 shows the simple changes made to a computer to initiate the advantageous features of this invention. Thus, the logic choice block 20 detects the second occurrence of a decimal point within a number or word. In response thereto the mode is changed from normal entry of the decimal point to the data entry mode for sending the word into an appropriate register as an operand, as indicated by block 21. In either case the computer is returned to the data entry mode for a next key selection 22. It is clear therefore that the usually necessary separate "entry" key is no longer needed because of this novel operational technique. The second occurrence of the decimal point in standard computers is ignored.

In order to minimize keyboard keys and operate the computer to select 133 programs in a program selection mode by means of only twelve keys, the execute (XQ) key also is provided with a special operation mode. It serves to terminate a word going into the main computer arithmetic register and establish the program selection mode designated by block 23. In this mode the twelve keys are activated for a two keystroke selection designated at 23, by which the desired one of the 133 programs on chart 18 hereinbefore discussed is selected. Upon function execution the computer produces a result on the electronic display panel 16 in FIG. 1, and in its normal manner returns to the data entry mode for the next problem or instruction.

The further notation A, B, etc. in the lower left key corner represents labels for storing and running programs, actuated by the LBL mode 7-8.

To implement this invention, I use computer functions available and well known in the art as set forth in the aforesaid Tung patent and computer model which is capable of selecting 96 functions with 39 keys. Thus, it is known to use the keys for dual purposes. That is these prior art computers use a key operable as applicant's XQ key to activate the keyboard for a program selection step. Many operations in the selection of programs routinely require two steps for a selection such as required for a program clear function when operating in a program mode with the hereinbefore identified computer. Thus, the provision of the two keystroke selection of a program step is a routine matter.

Similarly the logical choices of the type used in the decimal point selection (20) process of this invention is routinely implemented. The usual computer simply ignores the second decimal point selection in a word and does nothing. This is changed to an active keystroke function in accordance with this invention to correspond to the same function as the replaced no longer needed "enter" key. In the ADD mode as shown before, the decimal point key can act as a plus key.

In all other respects the computer may have the same modes of operation, including the user, program, imaginary number modes, etc. that are available on standard computer chips now available. It is therefore clear that applicant has unexpectedly and simply converted a computer operation mode and accompanying keyboard into a system and operating mode that permits many more computer functions per key to be realized than heretofore believed possible. By reducing the number of keys not only are circuitry and cost reductions effected, but the keyboard becomes much easier to use according to the touch system as mentioned before. I estimate that entering programs into a computer using a touch system keyboard, that the speed of program entry can be improved by a factor of 3.

Figure 3:
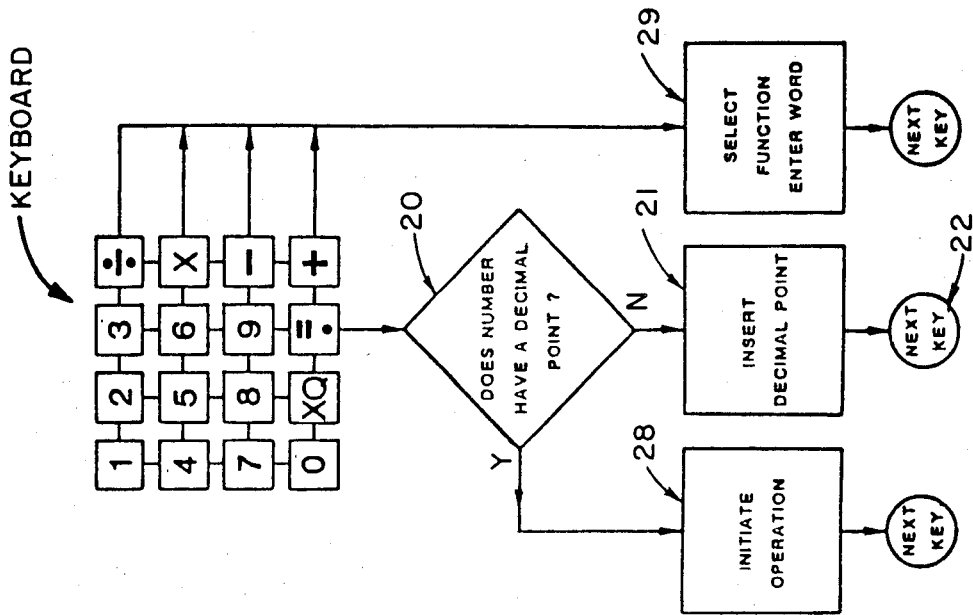
FIG. 3 is a schematic data flow chart of the operational control system of the invention operable in the arithmetic conventional mode of operation.

The FIG. 3 embodiment illustrates a slightly modified system that incorporates the same advantages and keyboard efficiency ratio with the standard arithmetic notation. In this notation a problem is worked in a conventional manner such as A plus B equals x. This requires a function to be designated between two words and an "equal" key to execute the called for function.

Thus the decimal point key replaces the "equal" key in the same manner as hereinbefore described with the presence of a second decimal point in the second word (B), as signified by block 20. However, this serves to initiate the data manipulation operation in accordance with a previously selected function as designated by block 28. The XQ key operates in the manner of FIG. 2.

In many arithmetic calculators, the frequently used calculations $\div$, $\times$, $-$, $+$ are directly actuable with a single keystroke. In this respect four extra keys are provided in a sixteen key keyboard and the block 29 designates their conventional mode of operation in selecting from live $+$, $-$, $\times$, $\div$ keys the appropriately designated calculating function or mode of operation.

Note that with sixteen keys on the keyboard the total number of functions selectable would be $16 \times 15 + 1 = 241$ using a 2 key command sequence. That is each key could designate fifteen execution choices to be made by the second keystroke and the chart corresponding to 18 in FIG. 1 could be accordingly expanded. This is highly desirable where fuller capacities of the computer chip built-in program step potential are to be realized.

It is now to be recognized that in accordance with this invention, the art has been advanced by making more of the built-in computer chip operations accessible to the keyboard than heretofore deemed feasible. Also surprisingly it is achieved by use of fewer keys than employed in prior art attempts to expand computer keyboard selection capabilities to keep up with the rapid advance of the computer chip capabilities.

The techniques of this invention are particularly adapted to hand-held pocket carried computers. When keyboards have many keys it is difficult to go through the programming and data entry steps with keys closely located together without error in actuation of a wrong key. There simply is not ample room on the keyboard for appropriate finger space. A typical key spacing of 1.15 cm is not compatible with the typical 1.9 cm width of a male fingertip. However, by use of this invention a sixteen key embodiment in a small handheld pocket size computer of 7.5 cm by 12 cm may have 2 cm spacing between horizontal key locations and 2.4 cm spacing between vertical key locations. In this manner the computer may be used without the probability of so many entry errors and with less care and caution in the keyboard entry procedure. In addition 16 keys are far more likely to have their positions learned by rote than would calculators having 35 or more keys. Therefore significant time should be saved in eliminating key-hunting.

A further significant advantage of this invention is in the graphic chart which carries on the computer keyboard the repertoire of program execution steps that are available. Rarely is an operation manual carried along with the computer. It would take up more room than the computer in most cases of the prior art because of the necessity to explain all the program variations not evident from the keyboard, etc. However, with this invention, after becoming acquainted with the basic operating rules, the large range of computer capabilities is made available right at the keyboard for reference. The keyboard therefore becomes substantially self-explanatory and as a reminder of the capability of the computer without having to reference the instruction manual.

Having therefore advanced the state of the art, those novel features of the invention believed descriptive of the spirit and nature of the invention are defined with particularity in the claims.

I claim:

1. A computer for performing a plurality of calculations with few keyboard keys on a keyboard having a register for retaining numerical digits of a numerical word, numerical digit entry keys and a decimal point key, said computer being of the type having a numerical entry mode for entering in sequence a set of numerical digits to form a numerical word and characterized by means employing the decimal point key as a control key for terminating and entering the numerical word into said register of the computer by establishing a mode of operation of the decimal point key in response to means detecting the second occurrence of a decimal point keystroke by said decimal point key within a word to initiate a control mode for entering that word into the computer register.

2. A computer as defined in claim 1 further comprising a control key operably connected to control means for terminating a data entry mode and activating the keyboard for a function select mode, wherein the keyboard keys designate to the control means functional commands to be executed for activating the keyboard keys including the decimal point key to operate in the function select mode to initiate arithmetic calculations and data command functions on said word in the computer.

3. A computer as defined in claim 1 with said keyboard consisting of twelve keys comprising ten said digit entry keys 0 to 9, said decimal point key and a further control key, comprising means operably connected to the further control key for terminating the numerical entry mode and activating the keyboard for a program selection mode wherein the keyboard designates to the computer functional commands to be executed.

4. A computer as defined in claim 3 wherein said control key operates computer means for establishing said program selection mode responsive to select a specified one of a large number of execution selections of the order of 144 by sequential designation of two keystrokes on the keyboard to designate the next data manipulation command when in the program selection mode.

5. A computer as defined in claim 4 including a graphic chart accompanying the keyboard charting the available execution selections in the program selection mode by reference to the specific two keystroke sequence for designation of an execution step.

6. A computer as defined in claim 1 having means to change the numerical entry mode to an add mode of operation accessible by stroking keys on said keyboard with the keyboard arranged to convert the numerical entry mode of operation in response to the second occurrence of the decimal key in a word to an add function.

7. A computer as defined in claim 1 having control means operable in the numerical entry mode by a further arithmetic key to select an arithmetic mode operable on at least two successive numerical words entered into the computer, and means responsive to the decimal key in the arithmetic mode in response to a single stroke to produce a numerical word resulting from the arithmetic operation on two successive numerical words entered into the computer.

* * * * *